(12) United States Patent
Buchmann (10) Patent No.: US 11,198,561 B2
(45) Date of Patent: Dec. 14, 2021

(54) RENDEZVOUS-PICKING INCLUDING LOCALLY VARIABLE PICKING STATION

(71) Applicant: SSI Schäfer Automation GmbH (AT), Graz (AT)

(72) Inventor: Rainer Buchmann, Graz (AT)

(73) Assignee: SSI Schäfer Automation GmbH (AT), Graz (AT)

( * ) Notice: Subject to any disclaimer, the term of this patent is extended or adjusted under 35 U.S.C. 154(b) by 469 days.

(21) Appl. No.: 16/309,495

(22) PCT Filed: Jun. 13, 2017

(86) PCT No.: PCT/EP2017/064333
§ 371 (c)(1),
(2) Date: Dec. 13, 2018

(87) PCT Pub. No.: WO2017/216127
PCT Pub. Date: Dec. 21, 2017

(65) Prior Publication Data
US 2021/0221615 A1    Jul. 22, 2021

(30) Foreign Application Priority Data

Jun. 13, 2016 (DE) .................... 10 2016 110 820.0

(51) Int. Cl.
*B65G 1/137* (2006.01)
(52) U.S. Cl.
CPC .................. *B65G 1/1375* (2013.01)
(58) Field of Classification Search
CPC ................................. B65G 1/1375
See application file for complete search history.

(56) References Cited

U.S. PATENT DOCUMENTS

| 2013/0103552 A1* | 4/2013 | Hoffman | G05D 1/0027 |
|---|---|---|---|
| | | | 705/28 |
| 2014/0100998 A1* | 4/2014 | Mountz | G06Q 10/08 |
| | | | 705/28 |

(Continued)

FOREIGN PATENT DOCUMENTS

| DE | 10 2013 106 640 A1 | 1/2015 |
|---|---|---|
| EP | 2 746 194 A1 | 6/2014 |

(Continued)

OTHER PUBLICATIONS

International Preliminary Report on Patentability for corresponding Patent Application No. PCT/EP2017/064333 dated Oct. 12, 2018.

(Continued)

*Primary Examiner* — Kyle O Logan
(74) *Attorney, Agent, or Firm* — Renner, Otto, Boisselle & Sklar, LLP (57) ABSTRACT

It is disclosed storage and order-picking system (10) operated in accordance with a rendezvous-picking principle, wherein goods to be picked are removed from source containers (18) and delivered to target containers (20) at locally variable picking stations (22) in accordance with customer orders, comprising: a plurality of vehicles (16) for transporting the source containers (18) and the target containers (20) within the system (10); a warehouse area (12), where a plurality of the source containers (18) is stocked, preferably in racks (34, 36); an action area (14) in which the vehicles (16) move, preferably in an autonomous manner; a locally variable picking station (22) having a variable relative position (P) within the action area (14) which changes again and again over time dependent on customer orders and at which a rendezvous-picking is performed by a picking person (24) and/or a picking robot (26); and a controlling device (30) configured for the rendezvous-picking by determining the relative position (P) as well as associated trans- (Continued)

port orders for the vehicles (16) by the controlling device in an optimized manner, wherein the transport orders for the vehicles (16) define a temporally and locally synchronized meeting of a customer-order specific number of the source containers (18) and a customer-order specific number of the target containers (20) at the variable picking station (22).

13 Claims, 5 Drawing Sheets

(56) References Cited

U.S. PATENT DOCUMENTS

| | | | |
|---|---|---|---|
| 2016/0107838 A1* | 4/2016 | Swinkels | B65G 1/0492 414/273 |
| 2016/0132059 A1* | 5/2016 | Mason | G05D 1/0234 701/28 |
| 2016/0236869 A1* | 8/2016 | Kimura | G05D 1/0291 |

FOREIGN PATENT DOCUMENTS

| | | |
|---|---|---|
| EP | 3 056 454 A1 | 8/2016 |
| WO | 2007/011814 A2 | 1/2007 |
| WO | 2015/052825 A1 | 4/2015 |

OTHER PUBLICATIONS

International Search Report and Written Opinion for corresponding Patent Application No. PCT/EP2017/064333 dated Sep. 28, 2017.

\* cited by examiner

| TIME (DAY.HOUR.MIN) | KP LOCATION/ POSITION | KP SIZE | SOURCE CONTAINER [Q#, F#, P] | TARGET CONTAINER [Z#, F#, P] | CUSTOMERS ORDER - # / PARTIAL ORDER - # |
|---|---|---|---|---|---|
| 5.3.16 - 5.3.24 | P(18/13) | P(12/10)-P(12/16)-P(21/16)-P(21/10)-P(12/10) | Q11F19P(18/15) | Z18F18P(18/11) | 18419 |
| 5.3.24 - 5.3.25 | | P(16/10)-P(16/16)-P(21/16)-P(21/10)-P(16/10) | Q43F4P(20/13) | •••• | 46157 |
| 5.3.25 - 5.3.40 | P(5/18) | •••• | •••• | •••• | 46157 |
| •••• | •••• | •••• | •••• | •••• | •••• |

S10:
- FOR SOURCE CONTAINERS, SHORT PATHS
- BATCH POTENTIAL, SELECTION OF ORDER GROUPS
- AS FEW AS POSSIBLE RETRIEVALS

S12:
- SELCTION OF VEHICLES, SHORT PATH + SHORT TIME
- SELECTION OF PICKER
- SELECTION OF LOCTAION OR RELATIVE POSITION
- SELECTION OF SIZE OF PS

RENDEZVOUS-PICKING INCLUDING LOCALLY VARIABLE PICKING STATION

The present invention relates to a storage and order-picking system as well as to a method for operating the same which are configured for performing "rendezvous-picking". The rendezvous-picking is distinguished in that both the material-flow sources and the material-flow sinks which are implemented by picking stations, or picking-work stations, are moveable within the overall system. These variable, or moveable, picking stations represent an additional degree of freedom during the scheduling of the picking process as well as during the operation of the system.

In the prior art substantially two picking principles are known, namely the goods-to-man principle (G2M principle) and the man-to-goods principle (M2G principle).

With the M2G principle the (mobile) pickers move throughout a warehouse for retrieving (stationary) articles directly from the (stationary) storage locations and for delivering the same into target locations, which are carried by the picker. For example, solutions are known where the picker travels on a storage and retrieval device for retrieving articles from pallets being stored in rack locations of a high-bay warehouse and delivers the removed articles onto a pallet carried by the storage and retrieval device and shipped to the customer later.

With the G2M principle the articles are moved, whereas the pickers are stationary. The G2M principle has many embodiments. In a very simple expression the (picking) sources, such as storage containers, are transported via stationary steady conveyers, such as belt or roller conveyers, to stationary picking stations where the picker stands for retrieving articles and delivering the same into target containers, such as order containers, which can be also transported via stationary steady conveyers to the picking station.

At present the stationary steady conveyers are increasingly substituted by driverless transport systems comprising autonomously travelling vehicles. The vehicles retrieve, for example, storage containers from warehouse areas and transport the storage containers to picking stations, positions of which are fixed, i.e. stationary, within the overall system. Further, for eliminating storage/retrieval processes of the storage containers, approaches already exist for transporting small transportable racks by the vehicles directly from the warehouse areas, without transferring the articles from the racks onto the vehicles, to the stationary picking stations, as exemplarily disclosed in WO 2007/011814 A2 by the Kiva Company.

Another problem with these approaches is to be seen in that transport paths are relatively long and (order) throughput times are huge. Another problem is to be seen in that number of the picking stations cannot be adapted to a workload of the system flexibly. During times of a low workload some of the picking stations are lonely, i.e. remain unoccupied, whereas during times of order peaks (e.g., during Christmas time in E-commerce) actually more picking stations are required than actually present.

It is an object of the present invention to provide a storage and order-picking system as well as a method for operating the same uniting the advantages of the G2M principle and the M2G principle and eliminating the disadvantages thereof. In particular picking performance (picks/hour) is to be enhanced. Further it is desired to allow flexible response to oscillating workloads.

This object is solved by a storage and order-picking system which is operated in accordance with the rendezvous-picking principle. With the rendezvous-picking principle at locally variable picking stations goods to be picked are retrieved from source containers and delivered to target containers in accordance with customer orders. The corresponding system comprises: a plurality of vehicles, in particular of autonomously movable vehicles, such as AGVs ("Automated Guided Vehicles"), "Weasels" (trademark, shuttles of the applicant), or mini storage and retrieval devices (cf. DE 10 2013 106 640 A1). The vehicles serve for transporting the source containers and the target containers, wherein the term container is not to be understood in a limiting way. Also, pallets, trays, cartons, and the like can be transported. Further, the system comprises a warehouse area and an action area. In the warehouse area the source containers are stocked, preferably in racks. The source containers can be filled with articles of one type only, or by articles of one type only in each compartment. In the action area the vehicles preferably move autonomously. In addition, the system comprises at least one locally variable picking station which comprises a variable relative position within the action area and changes again and again over the time dependent on a customer order, and where rendezvous-picking is performed by a picking person and/or by a picking robot. The rendezvous-picking occurs in a customer-order orientated manner. With the rendezvous-picking articles are retrieved from source containers and delivered to target containers, namely at a variable location, i.e. at the rendezvous location where source containers and target containers meet. Further, the system comprises a controlling device, such as a warehouse-management computer (WMC), a material-flow computer (MFC), a computer for planning navigation and routes of the vehicles, an order administration, and/or the like, which is configured for the rendezvous-picking in that the relative position of the variable picking station as well as associated transport orders for the vehicles are determined, generated, and communicated in an optimized manner by the controlling device. The transport orders for the vehicles are defined by a temporally and locally synchronized meeting of a customer-order specific number of source containers and a customer-order specific number of target containers at the variable picking station.

The invention distinguishes by its locally variable picking station. Not only the source containers and target containers are moved, but also the picking stations. The variable picking stations can be moved towards the source containers and target containers. The conceptionally "movable" picking stations meet the movable source containers and target containers so that a "rendezvous" occurs. As a result, path times and order throughput times are shortened. The system can process several orders within the same time suc-cessfully. The dynamics of the system are increased because even the pickers move in addition to the source containers and target containers, be it for one single pick only, i.e. for the removal and delivery of one single article.

The system is capable of responding flexibly to an oscillating workload. Picking stations can be added or removed at any time by sending out more or less pickers (article transfer units) into the system. Stationary (picking) work stations, which are connected expensively in terms of conveyers, having a complex routing are omitted. The invest-ment and mainte-nance costs are lowered for the operator of the storage and order-picking system of the invention. The operator can add vehicles to the system at any time, for example, by leasing in order to absorb workload peaks.

Preferably the optimized determination of the relative position as well as of the transport orders of the vehicles includes a path optimization and/or a throughput-time optimization.

Thereby it is possible to increase the performance because less time is required for processing the (customer) orders. The vehicles reach its destinations faster. The picks can be performed earlier.

With a preferred embodiment the variable picking station further comprises an outer boundary determined by the controlling device in a customer-order specific manner such that each of the containers required for the processing of the respective customer order can be buffered within the variable picking station.

Thus it is ensured that the picker does not need to wait for the source containers, or target containers, for performing the actions (removal and delivery) which are scheduled in advance by the controlling device at the present location of the picking station. The outer boundary defines clearly an area into which other vehicles are not allowed to enter. Thereby traffic scheduling is facilitated. Also, the scheduling of the positions of different picking stations, relative to each other, is facilitated.

Further, it is advantageous if the warehouse area and the action area are different.

In this case a clear and strict separation of the functions "warehousing" and "picking" is performed which allows the traffic of the vehicles to flow more fluently and which makes it easier to schedule. No traffic jams occur in the warehouse area because the vehicles are located there only for the purpose of storage and retrieval of the source containers.

With another particular embodiment one of the vehicles is configured to carry the picking person and to move the same within the action area safely.

This aspect substantially relates to a manual rendezvous-picking process. The picking person can be moved on the vehicle safely, with regard to industrial law, through the action area. Collision avoidance is regulated by the vehicle itself so that the picking person does not need to take care of it. This relaxes the picking person, in particular when the traffic occurrence, which is typically present within the action area, is high.

Further, this embodiment is ergonomic because, over the time, the picking person does not need to walk to the different positions of the variable picking station, but is conveyed thereto. The picking person can be brought to a desired location, or to a next relative position of the picking station in accordance with a schedule, faster by the vehicle than by feet. Positioning errors are excluded. The picking person is not required to orientate within the action area so that the cognitive load is again decreased. The picking person can use the travelling time for checking and/or packing.

With another preferred embodiment the picking robot is mounted on one of the vehicles.

This case relates to an automated picking process resulting in an increased performance with regard to a number of picks per unit of time, in particular with goods which are simple to grab.

In particular the action area has a fixed position within the system and/or a fixed outer boundary.

This measure facilitates the planning, or scheduling, of the relative positions of the variable picking stations and of the transport orders of the vehicles. Outside of the fixed action area humans can be located or walk through the system by feet without being subjected to the risk of being hit by one of the vehicles.

Further, the above-mentioned object is solved by a method for operating a storage and order-picking system in accordance with a rendezvous-picking principle, wherein at locally variable picking stations goods to be picked are retrieved from source containers and delivered to target containers in accordance with picking orders, wherein the system comprises: a plurality of vehicles for transporting the source containers and the target containers within the system; a warehouse area and an action area; a locally variable picking station comprising a variable relative position within the action area which changes again and again over time dependent on a customer order; and a controlling device configured for planning and performing the rendezvous-picking process; wherein the method comprises: analyzing a plurality of customer orders, in particular for the criteria: source-container location, target-container location, and/or batch potential of the customer orders; selecting an (optimal) relative position for the variable picking station and determining transport orders for the vehicles, wherein the transport orders for the vehicles define a temporally and locally synchronized meeting ("rendezvous") of a customer-order specific number of the source containers and of a customer-order specific number of the target containers at the selected relative position of the variable picking station; and performing the transport orders and the picking at the variable picking station.

It is clear that the above-mentioned and hereinafter still to be explained features cannot only be used in the respectively given combination but also in other combinations, or alone, without departing from the scope of the invention.

Embodiments of the invention are depicted in the drawings and will be explained in more detail below, wherein.

In the following description similar elements, components, parts, and features are provided with similar reference numerals, wherein the disclosures included here can be transferred roughly to similar elements, components, parts, and features having similar reference numerals. Positional information such as "top", "bottom", "lateral", "vertical", "horizontal", and the like refer directly to the described figure(s) and are to be transferred roughly in case of a positional change to the new altitude, or position.

Further, it is to be considered that directional indications and orientations are taken as a basis which basically lean on designations being typical in the field of (intra) logistics. Consequently, longitudinal direction is designated by "X", transversal direction is designated by "Z", and height direction is designated by "Y". For example, a (e.g., Cartesian) coordinate system XYZ, which corresponds thereto, can be taken from FIG. 1.

If the expression "number of objects" is used in the following, then this expression is generally to be understood such that both one single object and a plurality of the objects can be included.

In the following, goods to be picked (i.e., articles, goods, cases, etc.) are stocked typically in a warehouse in terms of so-called (stock) keeping units ("SKU"). The invention is configured to perform "batch picking". During batch picking several customer orders, or picking orders, are processed simultaneously.

Typically a "picking order", or "customer order", is provided as a data set. In the following it is generally referred to "orders". Each order can comprise a head field, a priority field, and/or an article field. The head field, amongst other things, can comprise information relating to the customers having put an order (e.g., customer addresses), or a customer-identification number as well as order numbers. The priority field includes information on whether it is a normal order or an urgent order. An urgent order is an order having high (processing) priority which is typically handled at a higher ranking compared to normal orders. An order further includes one or more order lines. Each order line specifies a number of an article, or article type, to be picked. The articles are typically provided as piece goods (piece picking) and/or cases (case picking).

With "batch picking" several orders are concatenated in an article-orientated manner so that only a few SKU need to be retrieved from the warehouse and need to be moved back into the warehouse after successful picking. During a corresponding article-orientated analysis of the orders a group of customer orders is selected which includes each order (order line) relating to an identical article type and then article-orientated transport commands are generated for the SKU. The SKU corresponding to this article type is then retrieved and transported to the picking station. At the picking station the picker removes each of the articles of the respective article type, i.e. the removal is performed in an article-orientated manner, and delivers the same in an order-specific preset number into the correspondingly provided order container(s). Each of the order containers has assigned one of the picking orders so that the delivery of the articles happens in an order-orientated manner. The order containers are conventionally kept at the picking station until each of the article types of the picking order has been delivered into the associated order container(s). So far, this could lead to an order-container jam at the picking station.

Figure 1:
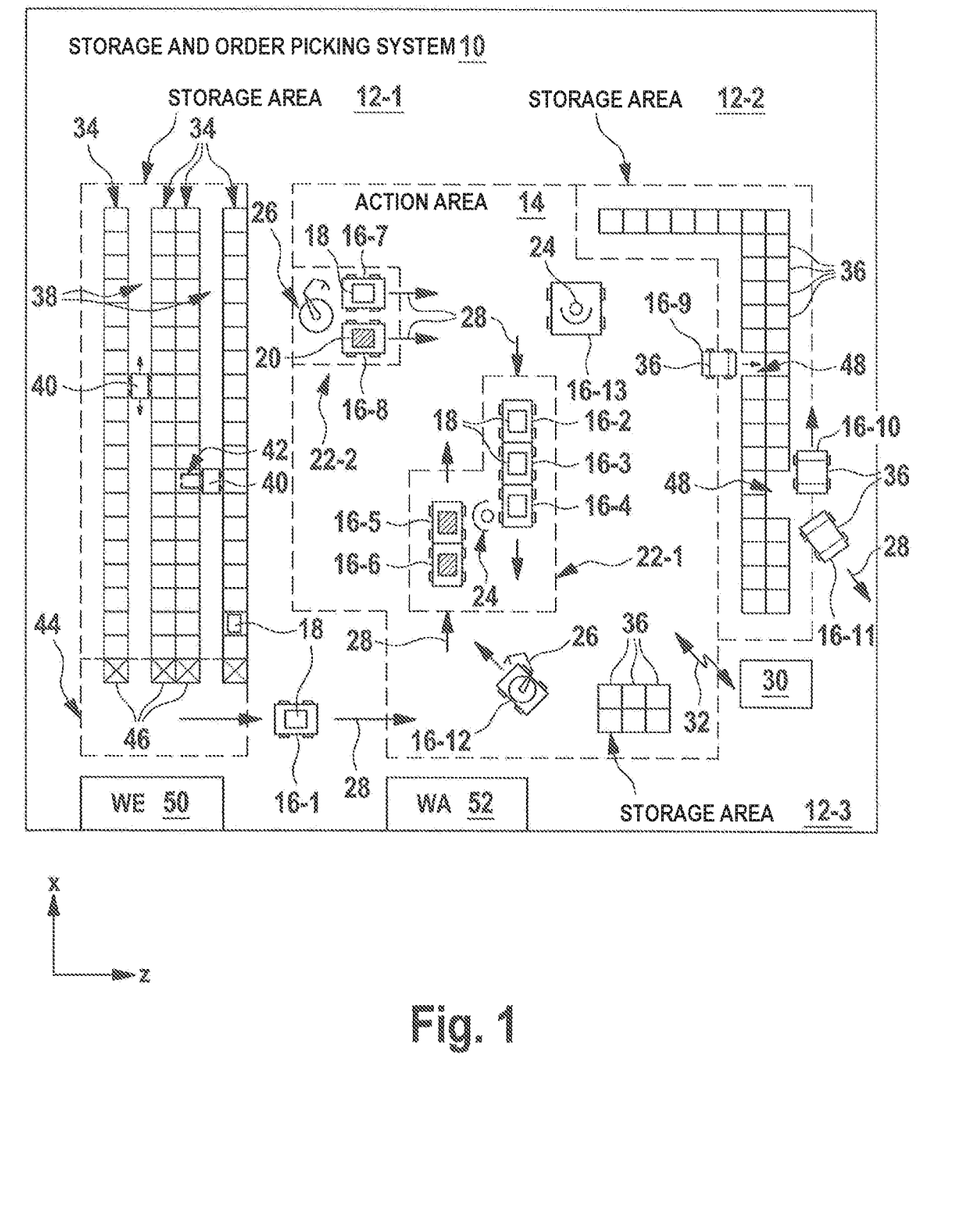
FIG. 1 shows a top view of an exemplary storage and order-picking system in accordance with the invention.

FIG. 1 schematically shows a top view of a storage and order-picking system 10 in accordance with the invention which will be designated in the following briefly as the "system 10". It is clear that the components of the system 10 shown in FIG. 1 are not to be understood in a limiting manner. Further, it is clear that the system 10 of FIG. 1 can be formed by different components, more components, or less components than the shown components.

In general, the system 10 includes a warehouse area 12, an action area 14, and a plurality of vehicles 16. The system 10 is distinguished by very high dynamics particularly expressed in that the vehicles 16 transport or move, in terms of material flow, sources and at the same time also, in terms of material flow, sinks so that the associated sources and sinks meet at the right time at the right location within the system, wherein the association is determined by customer orders, as will be explained in more detail below. It is the result of one or more intralogistic optimization processes, as it will also be explained further below in more detail, that the sources and sinks meet at the right time at the right location.

The areas 12 and 14 are surrounded in FIG. 1 respectively by a dashed line. The areas 12 and 14 represent areas, e.g., within a building which is not shown here in more detail. In these areas generally known functions (warehouse, goods receipt, goods issue, picking, etc.) of an intralogistic system (e.g., a distribution center) are realized. The warehouse area(s) 12 serve substantially for stocking goods which are to be picked, but can also be used for stocking order containers, or shipping containers. The action area(s) 14 (FIG. 1 exemplarily shows only one single action area 14) substantially serve for picking, i.e. re-distribution of the goods to be picked in accordance with orders, and serve as travelling areas for the vehicles 16. The vehicles 16 substantially handle a flow of material, or flow of goods, within the system 10 which can also be supported additionally by climbing conveyers. In addition to the transport of goods the vehicles 16 can also be used for moving a picking person 24, or a picking robot 26, as will be explained in more detail below.

In FIG. 1 three warehouse areas 12-1 to 12-3 are exemplarily shown, which are exemplarily positioned separately to each other within the system 10. It is clear that more or less warehouse areas 12 can be provided which can also be linked to each other, if necessary. For example, one single action area 14 is shown which is preferably arranged centrally in relation to the warehouse areas 12 within the system 10. Also, several action areas 14 can be provided. The shown action area 14 exemplarily represents a linked-up area which, for example, encloses the warehouse area 12-3. It is clear that the action area 14 can also be defined by several areas, which are separated from each other. The warehouse area 12-1 is arranged, for example, distanced to the action area 14. The warehouse area 12-2 is directly adjacent to the action area 14. The warehouse area 12-3 is arranged within the action area 14, or is enclosed by the action area 14. In this case the designers (e.g., layout creators) for systems 10 are completely free in defining positions, dimensions, and boundaries of the picking regions, such as the warehouse areas 12-1 to 12-3 and the action area 14. Areas can overlap each other. Further, it is clear that the action area 14 can include the entire remaining area of the system 10 which is not required by other components, such as the warehouse areas 12. The action area 14 substantially serves as a travelling area for the vehicles 16 transporting the source containers 18 and target containers 20 to and from one or more picking stations 22. The picking stations 22 are positioned within the action area 14. In FIG. 1 two picking stations 22-1 and 22-2 are exemplarily shown, which in FIG. 1 are surrounded respectively by a dashed line for illustration as well.

The picking stations 22 include, amongst other things, locations, or positions, spaces, and/or areas where manual picking by picking persons 24 (cf. picking station 22-1), or an automated picking by means of picking robots 26 (cf. picking station 22-2), is performed. If necessary, the picking stations 22 comprise further (physical) elements such as tables, packing materials, tools, and the like which are required for supportingly performing the actual picking process (removal and delivery of goods). "Picking" is to be understood in a simplified manner as a process where the goods to be picked are retrieved in conformity with one or more orders from source containers 18 and then delivered to associated target containers 20. Each (picking) order can be divided into several partial orders, for example, by associating each partial order with a dedicated target container 20 so that the goods of one single order are at least collected separately into several target containers 20.

The source containers 18 can be realized, for example, by storage containers which are filled with articles of one type only. This means that a corresponding source container 18 contains exclusively articles of one single article type. Alternatively and supplementarily the source containers 18 can be "compartment-divided". This means that a corresponding source container 18 is divided into several compartments, which are in turn preferably filled respectively with articles of one type only. Additionally, it is possible to use the source containers 18 with articles of two or more article types without compartment division, where then some few selected article types are stocked chaotically mixed for the purpose of optimization of a filling degree of the source containers 18.

The target containers 20 can be realized, for example, by so-called order containers. The target containers 20 get assigned the orders for processing. The goods are collected in an order-orientated manner into the target containers.

It is clear that the term "container" as used here is not to be understood in a limiting manner. The term "container" also includes load-carrier types different to containers, such as pallets, trays, cartons, grid carts, and the like. This applies to both the source containers 18 and the target containers 20.

The vehicles 16 can move autonomously within the system 10. The term "autonomous travelling, or moving" which is sometimes also called automated travelling, automated moving, or piloted travelling, is to be understood generally as moving (motorized) vehicles, mobile robots, and driverless transport systems, which behave autonomously as far as possible. With the present invention the autonomous travelling is associated with the vehicles 16 which behave similar to aircraft in the autopilot mode, i.e. conduct steering, accelerating and decelerating maneuvers along or transversally to a travelling track without human interaction. The vehicles 16 can be configured to autonomously search their routes within an area which is preferably defined fixedly, such as within the action area 14. The vehicles 16 are autonomous and independent. To a certain degree the vehicles 16 can independently take decisions with regard to routes and travelling paths thereof. Navigation and guidance of the vehicles 16 can be conducted, for example, based on way points 86 (cf. FIG. 3) which are preferably distributed uniformly on a facility ground, as it will be explained in more detail below.

The vehicles 16 are preferably implemented in terms of driverless transport vehicles, as described exemplarily in the German patent applications DE 10 2014 111 385 (Weasel-3D matrix), DE 10 2014 111 396 (loading/unloading of Weasels), DE 10 2014 111 394 (dynamic shift of sequence), DE 10 2015 114 370 (displaced axes), DE 10 2015 114 393 (transfer locations), and DE 10 2015 114 410 (Weasel Logimat). The transport vehicles 16 are configured, amongst other things, for the transport of the components mentioned in the following: source containers 18, target containers 20, picking persons 24, and/or picking robots 26. The vehicles 16 can be used universally with regard to the objects to be transported. The vehicles 16 can be different with regard to dimensions and performances thereof (velocity, transport capacity, travelling duration, or travelling capacity, etc.).

In FIG. 1 different travelling directions of the vehicles 16 are exemplarily shown in terms of dark arrows 28. The vehicles 16 substantially take care of the material flow, or goods flow, within the system 10. If a goods receipt (WE) 50 and/or a goods issue (WA) 52 are provided, the vehicles 16 also deal with the material flow from and to the goods receipt 50, or goods issue 52.

Both the material flow and a control of the vehicles 16 (e.g. navigation, route planning, traffic control, etc.) are conducted by a controlling device 30, or a subunit thereof, which will be explained in more detail below. The controlling device 30 is implemented in FIG. 1 exemplarily as one single central unit. It is clear that the controlling device 30 can also be organized in a decentralized manner. The controlling device 30 is implemented by one or more data-processing systems (computers, servers, hosts, etc.). The controlling device 30 can be implemented in terms of hardware and/or software.

The controlling device 30 is further configured to communicate, preferably wirelessly (cf. double arrow 32 in FIG. 1), with the different components of the system 10, in particular with the vehicles 16.

The controlling device 30 can include processors units, computers, servers, storage-programmable controllers (SPS), memory units, communication units, input/output units, and/or display units. The processors units serve for executing instructions which can be loaded into the memory or which are already present in the memory. The processors units can respectively comprise a number of processors, multi processors, or other types of processors. The memory units are configured to store information such as data, programs in terms of functions, or any other suitable information. The input/output units allow input and output of data into and from other devices which can be connected to the data-processing system. The input/output units can include, for example, a keyboard, a mouse, or the like. Instructions for the operating system, applications, and/or programs can be located in the memory units which are connected to the processors units, for example, via a communication network 80 (cf. FIG. 2). The above-mentioned components of the data-processing system are not to be understood in a limiting manner. The controlling device 30 can be implemented by using each hardware or each system capable of executing program codes or an application.

Figure 2:
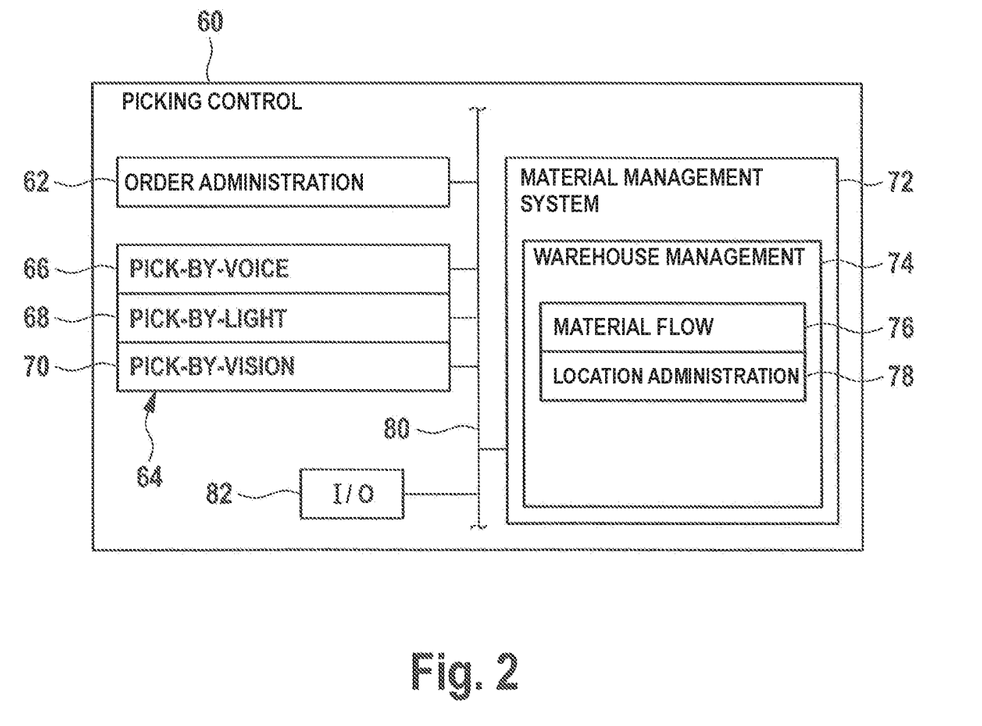
FIG. 2 shows a block diagram of a picking control.

FIG. 2 shows a block diagram of an exemplary picking control 60. The picking control 60 of FIG. 2 is at least partially included in the controlling device 30 of FIG. 1. The picking control 60 of FIG. 2 is structured modularly, preferably in a distributed manner. The picking control 60 can comprise: an order administration 62, (picking) guidance strategies 64 (such as pick-by-voice 66, pick-by-light 68, pick-by-vision 70, or the like), a material management system 72 which in turn comprises a warehouse management 74 (e.g., in terms of a warehouse-management computer (not shown)) which in turn typically controls a material flow 76 as well as a (warehouse or storage) location administration 78, a communication network 80, and/or an interface administration 82. The modules 62 to 82 are typically implemented in terms of hardware and/or software. The different modules 62 to 82 can communicate with each other over the communication network 80 (e.g., one or more communication busses). A dedicated material-flow computer (MFC, not shown) can be provided for the material flow 76.

The order administration 62 takes care, amongst other things, that incoming orders are collected and analyzed for filling the warehouse areas 12 correspondingly. In this context factors such as workload, assortment, path optimization, and the like, can play a factor. The picking stations 22 can get assigned, by the order administration, complete orders but also only partial orders for processing. A different task of the order administration 62 is to administer the picking stations 22 within the action area 14 dynamically in terms of location, time, and geometry. This means that the picking station 22 changes its position and spatial dimension dependent on an order for achieving multiple optimization, for example, with regard to throughput time (shortest time), and path (shortest path), as will be explained in more detail below. Further, the orders can be weighted differently with regard to a processing thereof, such as urgent orders which need to be processed exceptionally fast.

The throughput-time optimization can touch several aspects, such as an order throughput time or a throughput time. The order throughput time is derived from the partial times of the involved functional areas and work stations. In this context it can be distinguished between physical and informational processes. The throughput time is the time between the entry of an order and its completion.

"Path optimization", or "trip optimization", are to be understood classically as storage or retrieval strategies for which a transport path as short as possible is calculated from the (stationary) warehouse to the (stationary) picking station, in particular if several possible sources (e.g., rack deposition locations) within the warehouse or several stationary picking stations exist, between which the goods of an order are to be transported back and forth. Typically, in this case, quantities are not considered which depend on articles or storage units. The problem of the calculation of the shortest path is also called "travelling-salesman problem", see also "Branch and Bound", "Greedy-Verfahren", "MAander-Heuristik", or "Largest-Gap-Heuristik" (source: www.logipedia.de).

General goals of the optimization with the present invention are: achieving the best possible result at given effort; achieving a defined result at minimum effort; and/or achieving the best possible result at lowest effort. With this purpose, for example, the vehicles 16, the picking persons 24, and the picking robots 26 are uniformly used to capacity without generating non-productive standstill times. Deadheadings of the vehicles 16 are to be avoided.

Another solution element of this optimization problem is to be seen in that the positions and dimensions of the picking stations 22 (in particular a space or an area within which the vehicles 16 rest until the processing, i.e. until the removal and delivery of the goods) within the action area 14 (can be varied or) are varied permanently. With the classic approach at least the removal and/or delivery positions are temporally and locally fixed. A classic picking station does not move, i.e. it does not change its position within the overall system. With the present invention even the picking persons 24 or the picking robots 26 are to move in addition to the containers 18 and 20, because the picking stations 22 "move" in that they change their positions over the time. This means with other words that not only the sources (source containers 18), in terms of material flow, but even the sinks (picking stations 22) "move" within the system and change locally/temporally, which represents an additional degree of freedom for the general process scheduling which is not given with conventional approaches.

For example, one of the picking persons 24 can move from a first picking station 22-$i$ to a second different picking station 22-$j$. In this case the second picking station 22-$j$, for example, is still in the process of being erected while the picking person 24 moves thereto. At the same time the first picking station 22-$i$ possibly could already dissolve.

These dynamics of the variable picking stations 22 particularly act on an operative scheduling, i.e. on a disposition of (transport) processes which are to be dealt with on a daily basis, such as the transport of the source containers 18 and the target containers 20. This degree of optimization freedom further can have an effect on resource assignment (source container 18—target container 20—picker 24 or 26) as well as on scheduling and sequence planning of the transport orders for the vehicles 16 (source container 18 meets target container 20 when and where, and vice versa?). Even route planning for the vehicles 16 can be affected by this since topology of the action area 14 permanently changes because a picking station 22 in a first moment, for example, is disturbing a vehicle route and in a second later moment is no longer present at all. Further, the optimization can have an effect on batch scheduling or be influenced by this, for example, in that a source container 18 travels to picking stations 22 which do not yet exist at the time of the entry of this source container 20 into the action area 14.

The movability of the picking stations 22 within the action area 14 is an expression of the so-called "rendezvous-picking". With the rendezvous-picking it is not only the sources moving but even the sinks. For the rendezvous-picking it is true that the relative position of the picking station 22 is to be optimized while of a plurality of factors are considered in an order-specific manner. Some of these factors have already been described in more detail above.

In addition, the relative position of the action area 14 within the system, and in relation to the warehouse area 12, as well as the dimensions of the action area 14 can be varied at any time.

Returning to the vehicles 16 of FIG. 1 in the following an exemplary material flow between the areas 12 and 14 will be described in more detail. One vehicle 16-1 transports a source container 18 from the warehouse area 12-1 into the action area 14. The warehouse area 12-1 comprises, for example, four stationary fixed racks 34, wherein respectively two of the racks 34 define a rack aisle 38 therebetween in which, for example, one-plane storage and retrieval devices (e.g., shuttles as described in the patent application DE 10 2015 101 948 (depth support)) 40 can be moved in turn along the racks 34 in order to store and/or retrieve source containers 18 and/or target containers 20 by means of their load-handling devices 42. The racks can be coupled (in terms of material flow) at an front end side to vertical conveyors 46, which in turn are arranged in a pre-zone region 44 directly adjacent, in the present case, for example, to the warehouse area 12-1. The vertical conveyors 46 serve (exclusively) for vertically transporting the containers 18 and 20. A corresponding rack arrangement, which includes the racks 34 and the vertical conveyors 46, is exemplarily described in the German utility model DE 20 2014 100 476 U1 (elevator assembly in pre-zone). Alternatively and/or supplementarily the warehouse area 12-1 could also comprise a plurality of rack-integrated vertical conveyors 46 (not shown), wherein in this case the pre-zone area could be omitted by supplying the racks 34, for example, via a vehicle plane arranged beneath, above, or through the racks 34.

The warehouse areas 12-1 to 12-3 preferably serve for stocking source containers 18. The warehouse areas 12-1 to 12-3 in this sense represent sources. It is clear that in the warehouse areas 12-1 to 12-3 even target containers 20 could be stocked (simultaneously). In this case the warehouse areas 12-1 to 12-3 also represent sources for the target containers. Alternatively, the target containers 20 can also be stocked in a separate depot (not shown) for, preferably empty, target containers 20 centrally or in a decentralized manner. As soon as one empty target container 20 gets assigned to one picking orders, or partial order, in terms of data by the order administration 62, the corresponding target container 20 can be retrieved by means of one or more of the vehicles 16 which have also been assigned to this order, and can be brought to an associated picking station 22 for the purpose of filling with articles. Correspondingly source containers 18 are assigned to the order, which in turn get assigned to vehicles 16. Also, the order gets assigned to one of the picking stations 22, wherein position and dimension of this picking station 22 are determined in advance in an order-specific (and dynamic) manner, in particular in the light of the above-described optimization processes.

The picking station 22-1 shown in FIG. 1 is operated manually by one picking person 24. FIG. 1 shows a snapshot where the picking station 22-1 is located almost centrally within the action area 14. Within the picking station 22-1 three additional vehicles 16-2 to 16-4 are shown serving source containers 18 there for the purpose of an order-orientated removal of articles. The picking station 22-1 of FIG. 1 further includes two additional vehicles 16-5 and 16-2 supplying the corresponding target containers 20 to the picking person 24 for the purpose of filling with articles from the served source containers 18.

The picking station 22-2 of FIG. 1 is operated in an automated manner by a picking robot 26. One source container 18 is delivered to the picking robot 26 within the picking station 22-2 by means of an additional vehicle 16-7. At the same time an associated target container 20 is delivered to the picking robot 26 by means of one additional vehicle 16-8.

As already mentioned, FIG. 1 merely shows a snapshot. As soon as the picking person 24 or the picking robot 26 has conducted each of the actions (removal/delivery of articles), which have been assigned to this picking station, the picking person 24 and the picking robot 26 can move to a different "new" picking station 22 localized at a different position within the action area 14 and comprising, if necessary, a different spatial dimension, as it will be described in more detail below. The new picking station 22 can also be implemented by the picking station 22-1, which has merely "wandered" to a different location within the action area 14.

In the example of FIG. 1 the picking person 24 located at the picking station 22-1 moves by feet. Alternatively, the picking person 24 can also generally travel with the vehicles 16, as exemplarily indicated for the vehicle 16-13. The vehicle 16-3 can be adapted to the picking person's 24 needs. This means that the vehicle 16-3 can comprise, for example, a platform which can be provided with a handrail, or safety fence, and if necessary with a table and/or the like. In this case the picking person 24 can move ergonomically because the picking person is driven through the system 10, and in particular can move safely with regard to work, because collisions between the picking persons 24 and other vehicles 16 transporting the containers 18 and 20 are avoided.

Another advantage is to be seen in that the picking person 24 can becomes active on different sides. In case of a rectangular platform of the vehicle 16 there are four possibili-ties to supply the source containers 18 and the target containers 20. It is clear that an association of the type "side of platform—type of container" can be changed dynamically, which represents a further degree of freedom for the scheduling and optimization of the processing of customer orders and with the generation of transport orders for the vehicles 16. Preferably, such picking stations 22 are equipped further with lamps, displays, loud-speakers, headsets, and the like in order to communicate to the picking person a location of retrieval and delivery of the goods as well as the number of the goods to be transferred.

Additionally, it is possible, for example, that two different picking persons 24 can access simultaneously, for example, from the left-hand side and the right-hand side or from above and from below, the identical source container 18 for processing different customer orders at different picking stations 22, which in this case overlap in this specific source container 18.

It is clear that the above also applies analogously for the picking robot 26. Even the picking robots 26 can be mounted on the vehicles 16, as exemplarily shown for the vehicle 16-12. The vehicles 16 can be used further for transporting mobile racks 36 being stocked in FIG. 1, for example, in the warehouse areas 12-2 and 12-3. In FIG. 1 the vehicles 16-9 to 16-11 transport, for example, respectively one of the mobile racks 36 from and to the warehouse area 12-2.

In FIG. 1 the mobile racks 36 are arranged in the warehouse area 12-2 (in the top view) in an L-shape. The corresponding L-shaped rack block in this case exemplarily comprises void locations 48 created by the distance of individual mobile racks 36 for the purpose of transport towards the picking stations 22. A corresponding picking concept, which is based on the utilization of mobile racks 36 in terms of sources, is exemplarily described in WO 2007/011814 A2 (Kiva).

Figure 3:
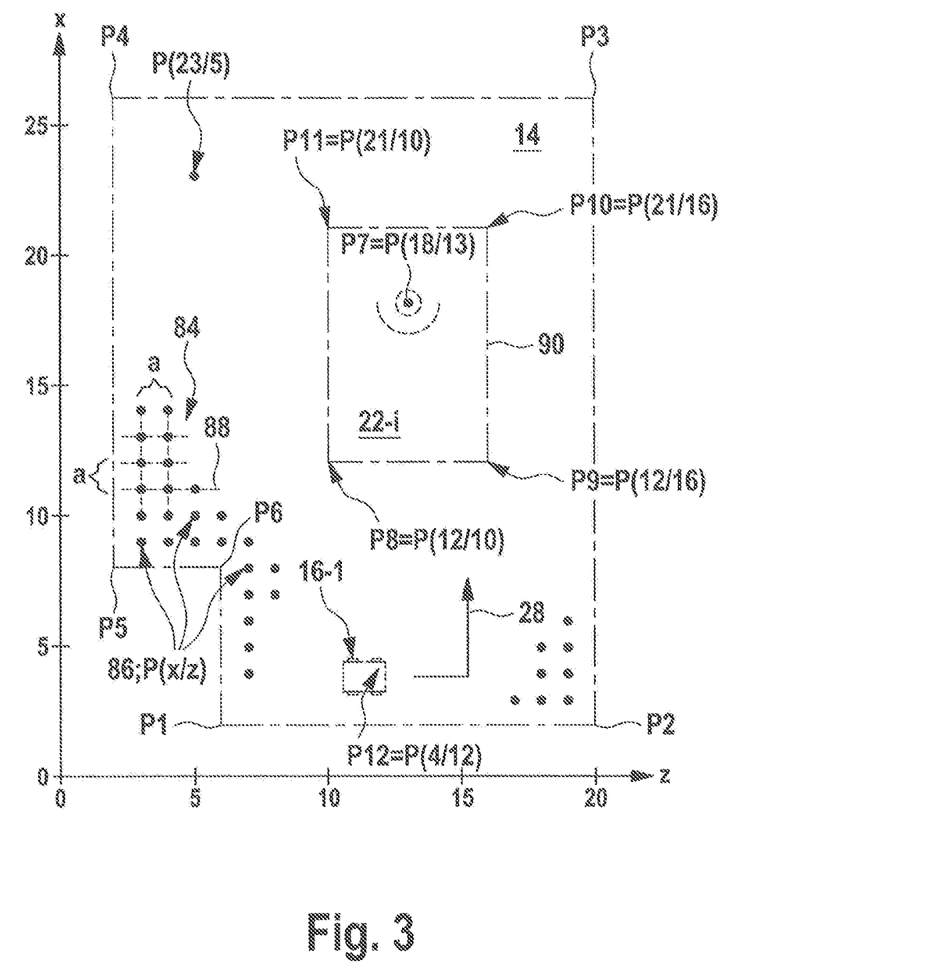
FIG. 3 shows an isolated illustration of an action area of FIG. 1.

FIG. 3 shows the action area 14 of FIG. 1 in an isolated manner, wherein for illustrating a positioning of the action area 14 within the system 10 the (imaginary) coordinate axes X and Z are additionally shown in FIG. 3. The selection of the location of the origin 0 of this coordinate axis is arbitrary. The origin could be located at any place within the system 10.

The action area 14 of FIG. 3 is spanned exemplarily by five corner points, or positions P(X/Z), namely by P1-P5. It could be spanned by more or less corner points. The system 10 of FIGS. 1 and 3 is orientated preferably along a (particularly uniform) grid structure 84 defined by grid points. These grid points are shown in FIG. 3 (partially) emphasized. These grid points can also be used for defining way points 86 for the navigation and positioning of the vehicles 16. The way points 86 can be implemented, for example, by barcode labels attached along the grid points of the grid structure 84 on the facility ground and which are then detected by the vehicles and/or the picking persons 24 for the purpose of orientation. The grid structure 84 is further indicated in FIG. 3 by (imaginary) auxiliary lines 88, which in turn can be distanced to each other at a grid constant "a". It is clear that the grid structure 84 shown in FIG. 3 is only of an exemplary nature. The grid points, or way points, 86 do not need to be distributed, for example, uniformly across the area of the system 10. The spatial distribution of the (orientation) points 86 can be selected arbitrarily. Alternatively to the physical way points 86, for example, a local GPS system or the like could be used.

The picking station 22-$i$ shown in FIG. 3 is operated manually, as indicated by means of a picker 24 shown by means of a dashed line. Preferably, a relative position P of the picking stations 22 is generally anchored in one location where the picking person 24, or the picking robot 26, is located during the picking process. The position P in this term represents an anchor point of the picking station 22. In FIG. 3 the relative position of the picking station 22-1 corresponds to the position P7. The position P7 has the coordinate X "18" and the coordinate Z "13" so that the position P7 can also be expressed as "P(18/13)".

The picking station 22-$i$ of FIG. 3 comprises an outer boundary 90 indicated in FIG. 3 by means of a dashed line. The outer boundary 90 is spanned by the positions P8 to P11 and exemplarily defines a rectangle. The outer boundary 90 encloses the area, or the space, around the relative position P7 of the picking station 22-$i$ in which the vehicles 16 (not shown here) are located while a picking process is performed. Both the relative position P and the outer boundary 90 of the picking stations 22 generally change over time in a customer-order specific manner, as will be explained in more detail below.

Further, one vehicle 16-1 is indicated in FIG. 3, which is located at the position P12, or "P(4/12)", for entering the picking station 22-$i$ along a travelling path, or travelling route, indicated by the arrow 28. The vehicle 16-1 can transport, for example, a customer-order specific source container 16 (not shown) or target container 20 (not shown).

It is clear that the size of the picking station 22-*i* can vary (over time) without changing the relative position (P7 in FIG. 3), which however can also change over time, if required. Typically, the size (area or space) of the picking station 22-*i* is selected such that each of the vehicles 16 within the picking station 22-*i*, or within an outer boundary 90 thereof, can be buffered. This means that the size and/or shape of the picking station 22-1 can change over time. The picking station 22-*i* shown in FIG. 3 is, for example, relatively big for buffer-ing simultaneously many vehicles 16. However, the size can also be made very small by, for example, associated source containers 18 or target containers 20 are transported by the same vehicle 16 and by requiring that this vehicle 16 only needs to meet the picking person 24, or the picking robot 26, at the predetermined meeting point (e.g., P7) at a predetermined time. It is clear that the point P7 can change over time. For example, this is the case if a movable picking robot 26, or a picking person 24 located on a vehicle 16, transfers the articles while both the picking robot 26, or the picking person 24, and the source container 18 and the target container 20 move relative to each other at a substantially identical velocity and with a substantially constant distance. This means that the transfer can also be performed during the travel (i.e., dynamically). The relative velocities and distances of the involved rendezvous partners should be approximately identical during the transfer. Deviations with regard to the velocity and the distance are acceptable as long as the transfer can be performed safely at the predetermined location. The picking person 24 is supposed to be not required to throw the articles to be transferred across greater distances (e.g., several meters) into the travelling-by target container 20, if possible.

Figure 4:
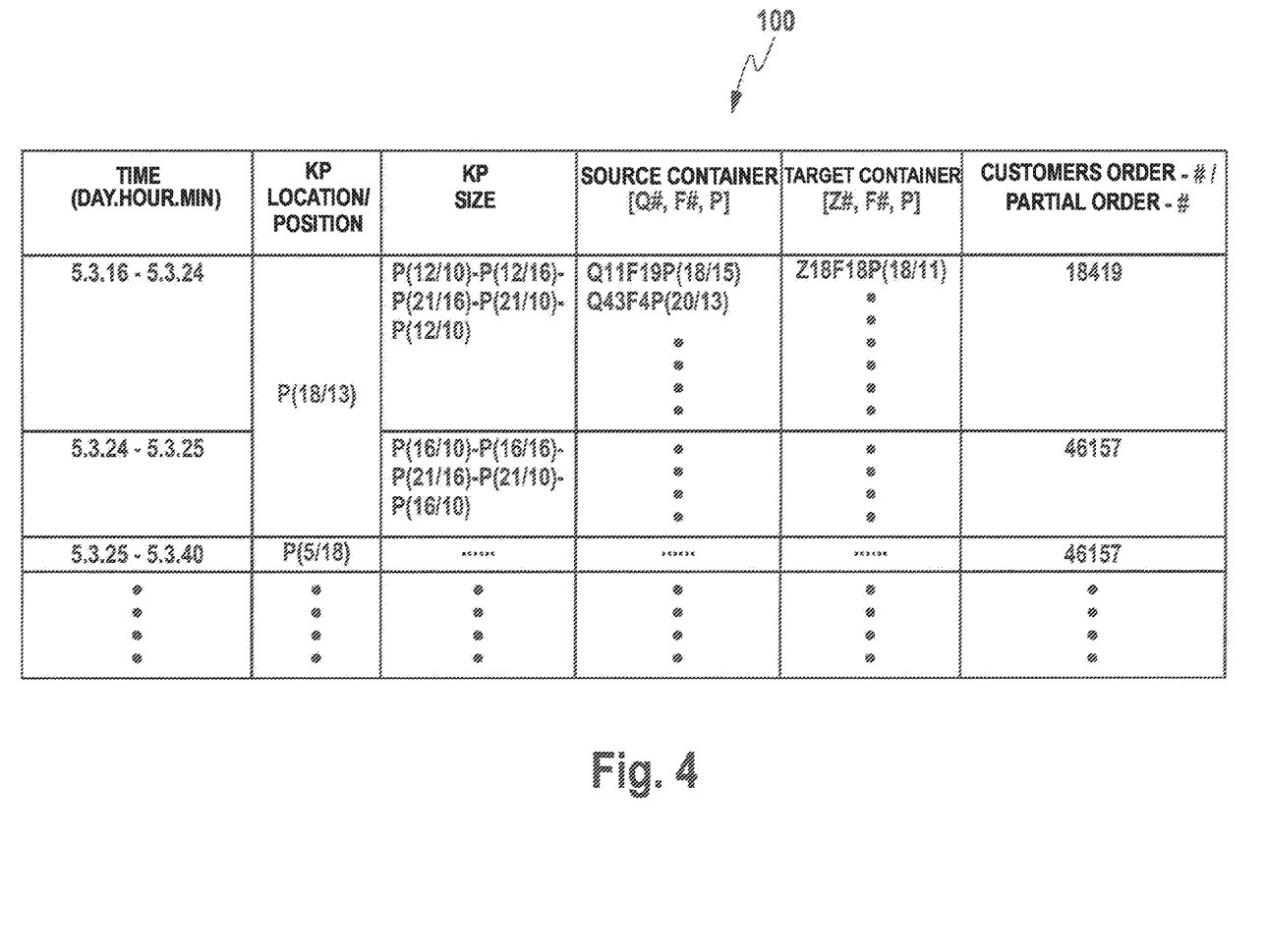
FIG. 4 shows a data set in terms of a table.

FIG. 4 shows an exemplary data set 100. The data set 100 is defined, for example, in terms of a table and serves for illustrating a local, temporal, and geometric change of a picking station 22. The data set 100 includes, for example, six columns. The first column illustrates a time line represented exemplarily in the format "day.hour.minute". The second column illustrates the above-mentioned relative position P of the corresponding picking station 22, i.e. a location, or position, P within the action area 14. The third column illustrates a geometric size, or an outer dimension, of the picking station 22 by defining the corner points being connected to each other in a closed manner via the outer boundary 90 (cf. FIG. 3). The fourth column illustrates one or more of the source containers 18 in the format "container number, vehicle number, position" required at the picking station 22. The fifth column illustrates the correspondingly required target containers 20 in the format "target-container number, vehicle number, position". The sixth column illustrates a cus-tomer-order number, or a partial order number, which has been assigned in advance to the mentioned columns.

It is clear that the data set 100 can comprise more or less columns. Further, it is clear that the data fields of the data set 100 can be stored in a distributed manner in the system 100. Data fields in a horizontal direction of the exemplary table of FIG. 4 belong to each other, or are assigned to each other.

The data set 100 describes, for example, two different relative positions P of the associated picking station 22, namely the position P(18/13) and P(5/18). The position P(18/13) is taken during a time 5.3.16-5.3.25. The position P(5/18) is taken during a time 5.3.25-5.3.40. During the time 5.3.16-5.3.25 the picking station 22 remains at the relative position P(18/13), but takes different sizes. During the time 5.3.16-5.3.24 the picking station 22 is bigger than during the time 5.3.24-5.3.25. The order having the number "18419" requires, for example, more source containers 18 and/or target containers 20 than the temporarily following order having the number "46157". The order having the number "18419" requires, for example, the source container 18 having the number "11" which is to be transported by the vehicle 16 having the number "19" to the position P(18/15) within the picking station 22. The corresponding target container 20 having the number "18" is to be brought by the vehicle 16 having the number "18" to the position P(18/11) for allowing to conduct the picking process.

From the time 5.3.25 the picking station 22 changes its relative position P, namely to the position P(5/18), although, for example, the same order number "46157" as before is processed. This can have several reasons. One possible reason is to be seen, for example, in that further source containers 18, which are required for processing the order having the number "46157, are already present in the action area 14 at the one hand, however presently, for example, are needed at a different picking station 22 (not shown here). In this manner storing back of these source containers 18 can be avoided.

It is clear that each of the presently used picking stations 22 preferably has its dedicated data set 100. The data sets 100 express the customer-order specific association of the source containers 18, the target containers 20, and the respective picking stations 22.

The data sets 100 represent the result of the above-described optimization processes. From the data set 100 of FIG. 4 it is evident that, for example, it is sufficient to define for the source containers 18 and the target containers 20 merely positions P within predetermined time windows without presetting the concrete travelling path in detail. Since the vehicles 16 preferably drive autonomously, the detailed preset of the concrete travelling path is not required either. The indication of the target position to steer-to is sufficient in this case. The temporal definition of the target point as well as the selection of the relative position of the picking station 22 and of the vehicles 16 and the containers 18 and 20 to be used is, however, an expression of the optimization process, in particular of the path optimization and/or the throughput time optimization, as explained above.

Figure 5:
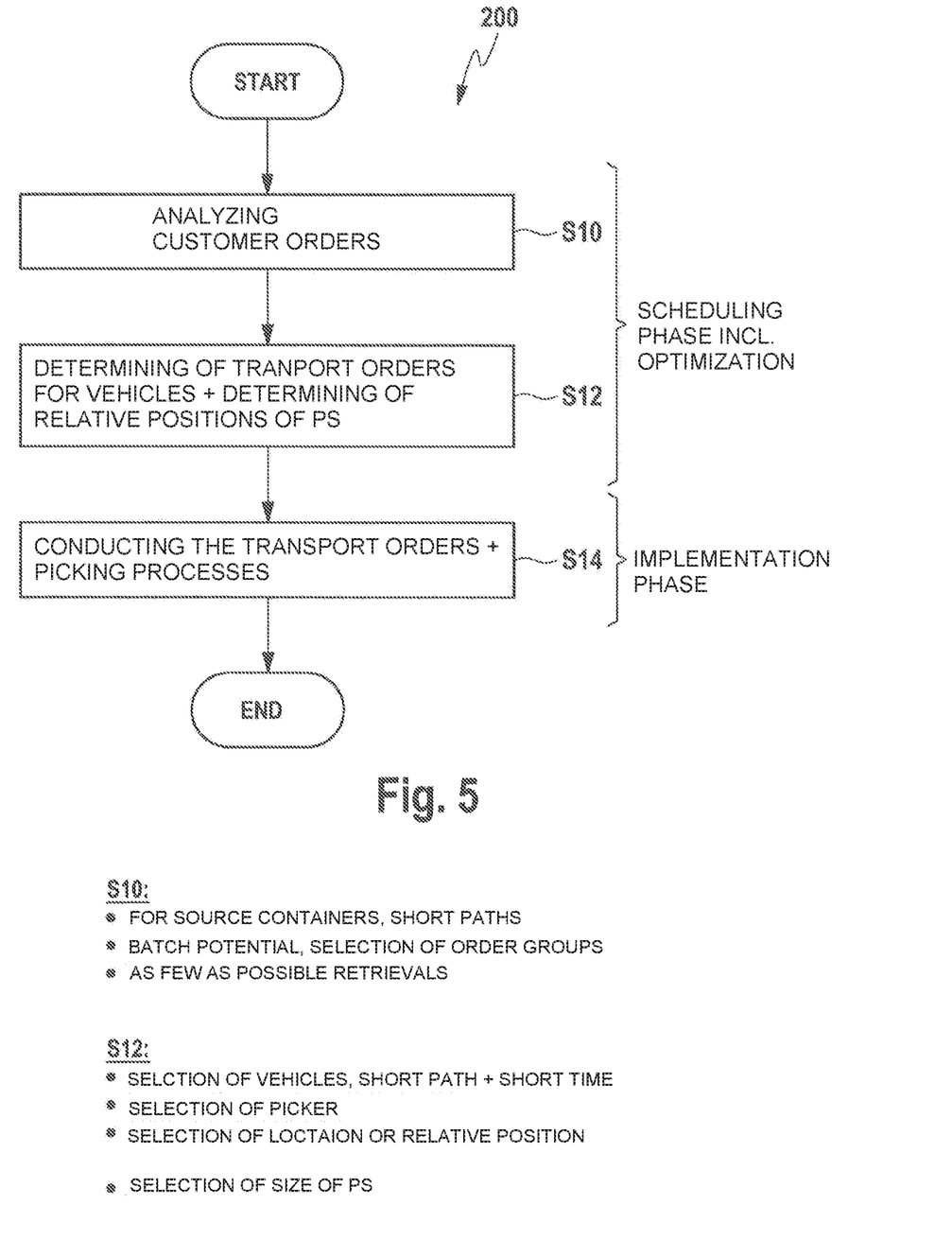
FIG. 5 shows a flow chart in accordance with the invention for operating a storage and order-picking system in accordance with the rendezvous-picking principle.

FIG. 5 shows a flow chart of a method 200 for operating a storage and order-picking system 10 in accordance with the rendezvous-picking principle where the goods, or articles, to be picked are retrieved from source containers and delivered to target containers at locally variable picking stations in accordance with customer orders.

In a first step S10 the customer orders are analyzed. The analysis can be conducted for one or more different criteria. One possible criterion represents the source-container location. The source containers 18 are associated, in terms of data, with the article types contained therein, which in turn are required by the customer orders. Further, the source containers 18 are associated, in terms of data, with a current position thereof, which corresponds, as a rule, to a storage location thereof within the warehouse area 12. Typically, however, several source containers 18 for each article type exist, which stock this article type, i.e. several possible sources exist. And thus, as a rule, there are several source-container locations for each article type, from where the vehicles 16 can retrieve the corresponding source container 18 and bring it to the picking station 22. In this sense the customer orders are also analyzed for the article types from which the possible source-container locations result. The resulting source-container locations later influence, in terms of possible starting points, the path optimization, namely in case the location, or the relative position P, of the variable picking station 22 is set, in terms of a corner point, within the action area 14.

Another analysis criterion of the step S10 is to be seen in the batch potential of the customer orders. As already explained above, during the batch picking groups of different customer orders are put together, which typically require the identical article type. This reduces a number of storing/retrieval processes in and from the warehouse area 12.

Further possible criteria are, for example, an access frequency (ABC distribution), capability of handling the articles (manual/automated picking capability), and the like.

In step S12 transport orders for the vehicles 16 as well as the relative positions P for the picking stations 22 are determined. It is clear that the steps S10 and S12 can be conducted simultaneously. The steps S10 and S12 illustrate a scheduling phase of the method 200 in which additional optimization steps are conducted.

In the step S12 specific vehicles 16 can be selected, which have to bring the source containers 18, the target containers 20, as well as the picking person 24 and/or the picking robot 26, if required, to the variable picking station 22. In this context, preferably, the factors "shortest path" and "shortest time" are relevant again. Further, in step S12 a picker, i.e., a picking person 24 or a picking robot 26, can be selected from a group of available pickers who have not received a current picking order. In addition, in the step S12 the selection of a location, or the relative position, P of the picking station 22 can be performed. Alternatively and supplementarily the size of the picking station 22 can be selected or determined.

Subsequently, in step S14 the transport orders and picking processes (removal and delivery), which are determined in the step S12, are conducted. The step S14 represents the implementation phase of the method 200 which subsequently ends.

Although the actions (transport, removal, delivery, etc.) within the action area 14 have been represented in the above description substantially in two dimensions within the area XZ, it is clear that even the third dimension Y, i.e. the height, can be considered additionally. The vehicles 16 can be implemented, for example, as autonomously flying drones (not shown) serving the containers 18 and 20 at different heights to the variable picking stations 22. Alternatively, platforms can be used.

In the following, further utilizations, methods, and procedures are generally considered which are possible due to the invention.

In the goods receipt (cf. WE 50 in FIG. 1) goods of one type only can be separated from bigger units (e.g. goods-receipt pallets holding a plurality of goods of the same type) into smaller storage containers (e.g., source containers 18), which in turn can be distributed very quickly over the entire system 10, where they are needed. Cross docketing is possible because even target containers 20 can already be filled in the goods receipt 50 by goods-receipt articles, wherein the corresponding picking station 22 is temporarily placed into the goods receipt 50 so that orders having highest priority can be completed at very small order throughput times. In general, orders can be completed within the goods receipt 50 which leads to small order throughput times by conducting, for example, individual picks in a well-aimed manner there.

The same is true for the handling of return goods. Return goods can be received immediately at site, i.e., for example, within the goods receipt 50, and can be picked again immediately since the picking stations 22 are dynamic, as known. As soon as a return good "signals" at any location within the system 10 to be able to sold again, preferably at high priority, a suitable (or new) target container 20 can be brought to this location for the purpose of retrieval.

Of course, the concepts described above in the context of picking can be transferred, after a conducted completion of the orders, even to the aspects of consolidation, sequencing, and compression.

Another advantage relates to a "picking sequence". A scheduled source container 18, which is just on the way to its dynamic picking station 22, can trigger a picking sequence. This means that not only the associated target container 20 belonging to this scheduled source container 18, but even further target containers 20 can move to this picking station 22, which require the identical article, an order of which, however, has actually not been started yet. Then the further target containers 20 can meet the scheduled source container 18 at the picking station 22 (multi-order pick).

Still another advantage is to be seen in that differently dimensioned source containers 18 and target containers 20 can be delivered to each other while the picking stations 22 can be dimensioned correspondingly. Pallets, grid boxes, containers, cartons, etc. can be provided individually at arbitrary locations, or positions, within the system 10 (e.g., even in specific zones and devices) for picking. The typical division and arrangement (big, small, light, heavy, etc.), in terms of conveyance and storage, can be omitted completely.

Further, idle times can be reduced, and degrees of work capacity utilization can be increased. Caused by the individual provision of the source containers 18 and the target containers 20 at an arbitrary location 22 different arrival times result therefrom due to the paths which are differently long. The picking person 24, or the picking robot 26, can only be called, for example, to the "temporary" picking station 22 when the corresponding order can be processed, i.e. the required containers 18 and 20 are at site in a sufficient number.

In addition, contrary to the fixedly installed conventional steady conveyers, a sequence can be influenced directly at the picking station 22 by bringing the vehicles 16 correspondingly in line, i.e. by bringing them exemplarily between vehicles 16 already waiting.

In particular a location observation of the vehicles 16 always results in a current position of the containers 18 and 20 as well as of the persons 24 and the robots 26. An explicit tracking of the containers 18 and 20 (e.g., by means of corresponding reading devices) is not required within the system 10 because the vehicle tracking is sufficient for knowing where an article/order is currently located. Checking the containers 18 and 20 again at the picking station 22 is unnecessary.

LIST OF REFERENCE NUMERALS 10 system
12 warehouse area
14 action area
16 vehicle
18 source container
20 target container
22 picking station
24 picking person
26 picking robot
28 travelling direction of 16 (dark arrow)
30 controlling device
32 communication, wireless 34 (stationary) rack
36 (mobile) rack
38 rack aisle
40 (rack) shuttle/SRD
42 load-handling device of 40
44 pre-zone area
46 vertical conveyers
48 void location
50 goods receipt (WE)
52 goods issue (WA)
60 picking control
62 order administration
64 guidance strategies
66 pick-by-voice, PbV
68 pick-by-light, PbL
70 pick-by-vision
72 material management system
74 warehouse management
76 material flow
78 (storage) location administration
80 communication network
82 interfaces
84 grid structure
86 way points
P positions
88 auxiliary lines
a grid constant
90 outer boundary of 22
100 data set
200 method

The invention claimed is:

1. A storage and order-picking system operated in accordance with a rendezvous-picking principle, wherein goods to be picked are removed from source containers and delivered to target containers at locally variable picking stations in accordance with customer orders, comprising:
 a plurality of vehicles for transporting the source containers and the target containers within the system;
 a warehouse area, where a plurality of the source containers is stocked;
 an action area in which the vehicles move, preferably in an autonomous manner;
 a locally variable picking station having a variable relative position within the action area which changes again and again over time dependent on customer orders and at which a rendezvous-picking is performed by at least one of a picking person or a picking robot; and
 a controlling device configured for the rendezvous-picking by determining the relative position as well as associated transport orders for the vehicles by the controlling device in an optimized manner, wherein the transport orders for the vehicles define a temporally and locally synchronized meeting of a customer-order specific number of the source containers and a customer-order specific number of the target containers at the variable picking station.

2. The storage and order-picking system of claim 1, wherein the optimized determination of the relative position as well as the transport orders of the vehicles by the controlling device includes at least one of a path optimization or a throughput time optimization.

3. The storage and order-picking system of claim 1, wherein the variable picking station further comprises an outer boundary, which is determined in a customer-order specific manner by the controlling device so that each of the containers required for the processing of the respective customer order can be buffered within the variable picking station.

4. The storage and order-picking system of claim 1, wherein the warehouse area is different to the action area.

5. The storage and order-picking system of claim 1, wherein one of the vehicles is configured to carry the picking person and move the picking person safely within the action area.

6. The storage and order-picking system of claim 1, wherein the picking robot is mounted on one of the vehicles.

7. The storage and order-picking system of claim 1, wherein the action area comprises at least one of a fixed position within the systemor a fixed outer boundary.

8. The storage and order-picking system of claim 1, wherein the action area includes a goods receipt.

9. The storage and order-picking system of claim 1, wherein the controlling device is further configured to receive return goods at the picking station and to use the return goods immediately in scheduling a new picking order for the purpose of picking.

10. A method for operating a storage and order-picking system in accordance with a rendezvous-picking principle, wherein goods to be picked are removed from source containers and delivered to target containers at locally variable picking stations in accordance with customer orders, and wherein the system comprises: a plurality of vehicles for transporting the source containers and the target containers as well as preferably picking persons, or picking robots, within the system; a warehouse area and an action area; a locally variable picking station comprising a variable relative position within the action area which changes again and again over the time dependent on customer orders; and a controlling device configured for scheduling and performing the rendezvous-picking; wherein the method comprises:
 analyzing a plurality of customer orders;
 selecting an optimal relative position for the variable picking station and determining transport orders for the vehicles, wherein the transport orders for the vehicles define a temporally and locally synchronized meeting of a customer-order specific number of the source containers and a customer-order specific number of the target containers at the selected relative position of the variable picking station; and
 performing the transport orders and the picking at the variable picking station.

11. The method of claim 10, wherein the picking occurs dynamically by moving at least one of: the source containers; the target containers; and the picking person, or the picking robot; through the action area during removal and delivery of the goods.

12. The storage and order-picking system of claim 9, wherein the sechuling of a new picking order is achieved by moving a suitable target container, which includes the received returned goods, to the picking station.

13. The method of claim 10, wherein the plurality of customer orders is analyzed for at least one of: source-container locations; target-container locations; or batch potential.

* * * * *